(12) United States Patent
Lee et al.

(10) Patent No.: US 11,963,647 B2
(45) Date of Patent: Apr. 23, 2024

(54) POLLUTION SOURCE DETERMINATION ROBOT CLEANER AND OPERATING METHOD THEREOF

(71) Applicant: SAMSUNG ELECTRONICS CO., LTD., Suwon-si (KR)

(72) Inventors: Namki Lee, Suwon-si (KR);
Changseok Oh, Suwon-si (KR);
Seunghwan Lee, Suwon-si (KR);
Chuljoo Kim, Suwon-si (KR);
Yongheon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 17/065,895

(22) Filed: Oct. 8, 2020

(65) Prior Publication Data
US 2021/0161351 A1    Jun. 3, 2021

(30) Foreign Application Priority Data
Dec. 3, 2019    (KR) ........................ 10-2019-0159327

(51) Int. Cl.
*A47L 11/40*      (2006.01)

(52) U.S. Cl.
CPC ........ *A47L 11/4011* (2013.01); *A47L 11/4061* (2013.01); *A47L 11/4066* (2013.01); *A47L 2201/04* (2013.01)

(58) Field of Classification Search
CPC .............. A47L 11/4011; A47L 11/4061; A47L 11/4066; A47L 2201/04; A47L 9/2805; A47L 9/2852; G05D 1/0246; G05D 1/0274; G05D 2201/0215
See application file for complete search history.

(56) References Cited

U.S. PATENT DOCUMENTS

| 8,756,751 B2 | 6/2014 | Jung et al. |
| 9,402,518 B2 | 8/2016 | Burlutskiy |
| 10,443,874 B2 | 10/2019 | Tang et al. |

(Continued)

FOREIGN PATENT DOCUMENTS

| EP | 2508957 | 10/2012 |
| EP | 2 912 982 | 6/2017 |

(Continued)

OTHER PUBLICATIONS

Bibliographic data/Abstract of KR20150022550A (Year: 2015).*

(Continued)

*Primary Examiner* — Douglas Lee
(74) *Attorney, Agent, or Firm* — Nixon & Vanderhye P.C.

(57) ABSTRACT

A robot cleaner is provided. The robot cleaner according to the disclosure includes a driver including a drive motor configured to cause the robot cleaner to move, a memory storing information on a pollution map for the degree of pollution for each location in a map corresponding to a place in which the robot cleaner is located and information on locations of a plurality of objects on the map, and a processor, wherein the processor is configured to: identify a pollution source among the plurality of objects based on information on the locations of the plurality of objects and the pollution map, and control the driver to move the robot cleaner based on the location of the identified pollution source on the map.

18 Claims, 21 Drawing Sheets

(56) References Cited

U.S. PATENT DOCUMENTS

| | | |
|---|---|---|
| 2012/0259481 A1 | 10/2012 | Kim |
| 2013/0206177 A1 | 8/2013 | Burlutskiy |
| 2015/0120128 A1 | 4/2015 | Rosenstein et al. |
| 2016/0334800 A1* | 11/2016 | Han ............... G05D 1/0274 |
| 2019/0082918 A1 | 3/2019 | Koetz |
| 2019/0128821 A1 | 5/2019 | Yang et al. |
| 2019/0213438 A1 | 7/2019 | Jones et al. |
| 2019/0343355 A1 | 11/2019 | Han et al. |
| 2019/0362234 A1 | 11/2019 | Maeng |
| 2020/0008639 A1 | 1/2020 | Lee et al. |
| 2020/0016764 A1* | 1/2020 | Chae ............... G06F 17/18 |
| 2020/0046193 A1 | 2/2020 | Chae |
| 2020/0054185 A1 | 2/2020 | Kim |

FOREIGN PATENT DOCUMENTS

| | | |
|---|---|---|
| EP | 3427625 | 1/2019 |
| JP | 2005-204872 | 8/2005 |
| JP | 6573173 | 8/2019 |
| KR | 10-0641110 | 11/2006 |
| KR | 10-0963783 | 6/2010 |
| KR | 10-2012-0114671 | 10/2012 |
| KR | 10-1483541 | 1/2015 |
| KR | 10-2015-0022550 | 3/2015 |
| KR | 20150022550 A * | 3/2015 |
| KR | 10-1634521 | 6/2016 |
| KR | 10-1856502 | 5/2018 |
| KR | 10-1880089 | 7/2018 |
| KR | 10-1938703 | 4/2019 |
| KR | 10-1984214 | 5/2019 |
| KR | 10-2019-0073139 | 6/2019 |
| KR | 10-2019-0086631 | 7/2019 |
| KR | 10-2019-0087355 | 7/2019 |
| KR | 10-2019-0105216 | 9/2019 |
| KR | 10-2019-0105530 | 9/2019 |
| KR | 10-2019-0106891 | 9/2019 |

OTHER PUBLICATIONS

KR102093710B1/KR20150022550A machine translation (Year: 2015).*
Extended European Search Report dated Sep. 16, 2022 issued by the European Patent Office for European Patent Application No. 20895010.5.
International Search Report and Written Opinion dated Mar. 18, 2021 in corresponding International Application No. PCT/KR2020/016153.
Chinese Office Action dated Jan. 4, 2023 for CN Application No. 202080076628.3.
Chinese Office Action dated Jul. 22, 2023 for CN Application No. 202080076628.3.
Chinese Decision on Rejection dated Jan. 15, 2024 for CN Application No. 202080076628.3.

* cited by examiner

FIG. 4D

| EVENT | POLLUTION SOURCE |
|---|---|
| BREAKFAST | DINING TABLE |
| VENTILATION | WINDOW, FLOWER POT |
| ⋮ | ⋮ |
| TV WATCHING | - |

441

⇨

| EVENT | POLLUTION SOURCE |
|---|---|
| BREAKFAST | DINING TABLE |
| VENTILATION | WINDOW, FLOWER POT |
| ⋮ | ⋮ |
| TV WATCHING | TABLE, SOFA |

442

POLLUTION SOURCE DETERMINATION ROBOT CLEANER AND OPERATING METHOD THEREOF

CROSS-REFERENCE TO RELATED APPLICATION

This application is based on and claims priority under 35 U.S.C. § 119 to Korean Patent Application No. 10-2019-0159327, filed on Dec. 3, 2019, in the Korean Intellectual Property Office, the disclosure of which is incorporated by reference herein in its entirety.

BACKGROUND

1. Field

The disclosure relates to a robot cleaner, and for example, to a robot cleaner which sets a moving path based on the location of a pollution source mapped to an event.

2. Description of Related Art

In the past, a robot cleaner which performed cleaning based on a pollution map for a specific place was disclosed.

However, according to the general technological common sense in the past, it is difficult for a robot cleaner to identify the current degree of pollution of each location unless the robot cleaner directly moves to each location.

Accordingly, a robot cleaner sets a moving path based on a pollution map in the past for optimization of a moving path.

However, in this case, the degree of pollution of each location at the present point is not reflected, and thus efficient and effective cleaning is difficult.

SUMMARY

A robot cleaner according to an example embodiment of the disclosure includes: a driver comprising a drive motor configured to move the robot cleaner, a memory storing information on a pollution map including a degree of pollution for each location in a map corresponding to a place in which the robot cleaner is located and information on locations of a plurality of objects on the map, and a processor operatively connected to the motor and the memory and configured to control the robot cleaner, wherein the processor is configured to: identify a pollution source among the plurality of objects based on information on the locations of the plurality of objects and the pollution map, and control the motor to move the robot cleaner based on the location of the identified pollution source on the map.

A method for operating a robot cleaner according to an example embodiment of the disclosure includes: identifying a pollution source among a plurality of objects based on information on locations of the plurality of objects and a pollution map, and moving the robot cleaner based on the location of the identified pollution source, wherein the pollution map includes information on a degree of pollution for each location in a map corresponding to a place in which the robot cleaner is located, and information on the locations of the plurality of objects includes information on the locations of the plurality of objects on the map.

A non-transitory computer-readable recording medium according to an example embodiment of the disclosure stores at least one instruction that is executable by a processor of a robot cleaner, and when executed, causes the robot cleaner perform operations including: identifying a pollution source among a plurality of objects based on information on locations of the plurality of objects and a pollution map, and moving the robot cleaner based on the location of the identified pollution source, wherein the pollution map includes information on a degree of pollution for each location in a map corresponding to a place in which the robot cleaner is located, and information on the locations of the plurality of objects includes information on the locations of the plurality of objects on the map.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 4D is a chart illustrating an example in which a robot cleaner determines a pollution source corresponding to a specific event according to various embodiments;

DETAILED DESCRIPTION

Figure 1A:
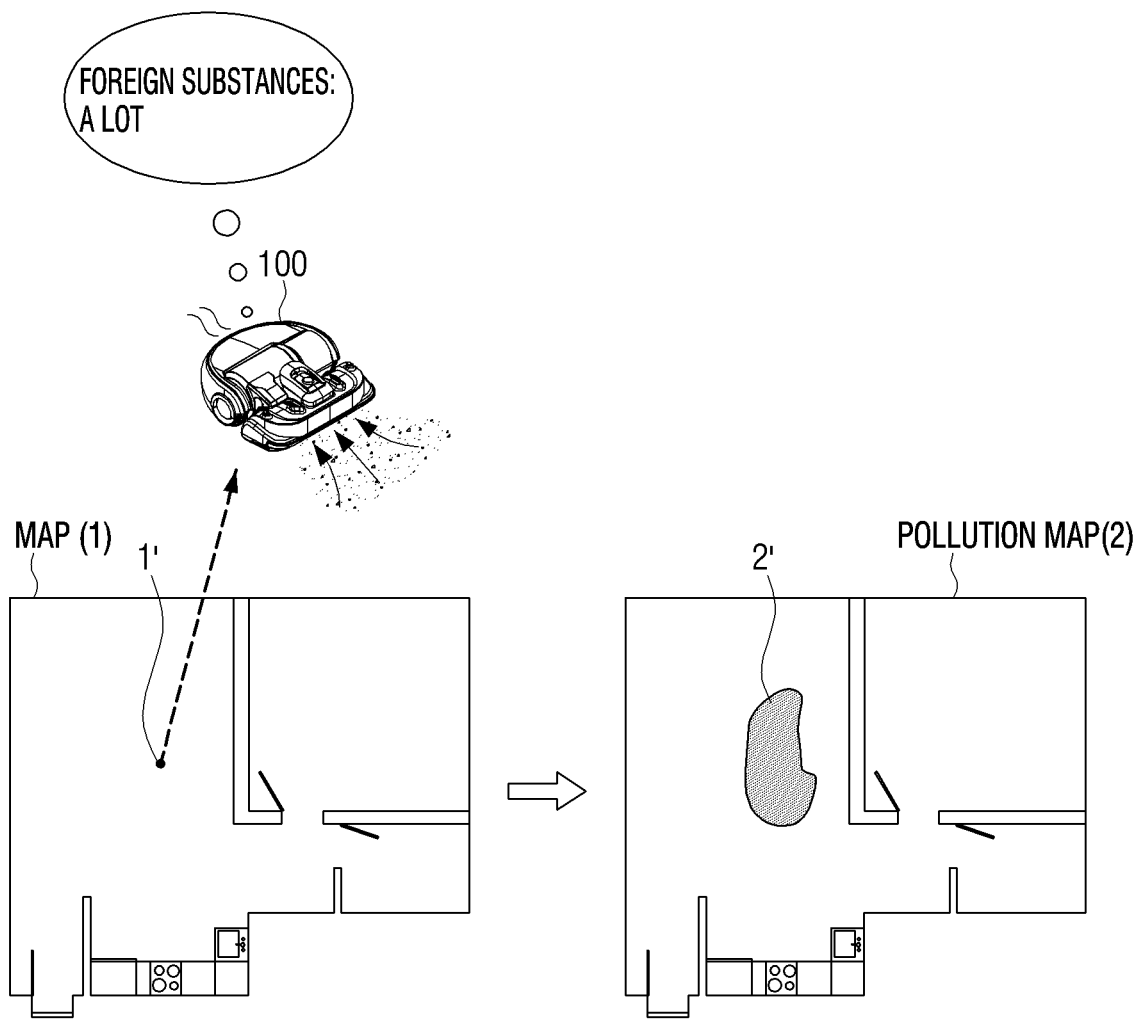
FIG. 1A is a diagram illustrating an example in which a robot cleaner determines a pollution source corresponding to a specific event according to various embodiments.

The disclosure provides a robot cleaner capable of setting an optical moving path when cleaning based on the time when various events occur.

The disclosure provides a robot cleaner that can determine the main pollution source mapped to each event, and can set a moving path based on the location of the determined pollution source.

Before describing the disclosure in detail, the format of this disclosure and the drawings will be discussed.

As terms used in this disclosure and the claims, general terms were selected in consideration of the functions described in the various example embodiments of the disclosure. However, the terms may vary depending on the intention of those skilled in the art who work in the pertinent field, legal or technical interpretation, emergence of new technologies, and the like. There may be some terms that are arbitrarily selected, and in such cases, the meaning of the terms should be interpreted in view of the disclosure. In case there is no specific definition of the terms, the meaning of the terms will be interpreted based on the overall content of the disclosure and common technical knowledge in the pertinent technical field.

Like reference numerals or symbols described in each drawing accompanying this disclosure indicate parts or components that perform substantially the same functions. For the convenience of explanation and understanding, the parts or components will be described using the same reference numerals or symbols in different embodiments. That is, even if a plurality of drawings all illustrate components having the same reference numerals, the plurality of drawings do not refer only to one embodiment.

In addition, in this disclosure and the claims, terms including ordinal numbers such as "the first" and "the second" may be used for distinguishing elements. These ordinal numbers are used to distinguish the same or similar elements from one another, and the meaning of terms should not be restrictively interpreted due to the use of such ordinal numbers. As an example, the order of using or the order of arranging elements combined with such ordinal numbers should not be restricted by the numbers. Depending on needs, each ordinal number may be used by being replaced with one another.

In this disclosure, singular expressions include plural expressions, as long as they do not conflict with the context. In addition, in the disclosure, terms such as "include" and "consist of" should be construed as designating that there are such characteristics, numbers, steps, operations, elements, components or a combination thereof described in the disclosure, but not as excluding in advance the existence or possibility of adding one or more of other characteristics, numbers, steps, operations, elements, components or a combination thereof.

In the embodiments of the disclosure, terms such as "module," "unit," "part," etc. are terms referring to elements performing at least one function or operation, and these elements may be implemented as hardware or software, or a combination of hardware and software. In addition, a plurality of "modules," "units," "parts," etc. may be integrated into at least one module or chip and implemented as at least one processor, excluding "a module," "a unit," "a part," etc. that needs to be implemented as independent specific hardware.

In the embodiments of the disclosure, the description that a part is "connected to" another part includes not only direct connection, but also indirect connection through still another medium. The description that a part "includes" an element can be interpreted to include other elements, but not that other elements are excluded, unless there is any specific description to the contrary.

FIG. 1A is a diagram illustrating an example in which a robot cleaner generates a pollution map according to various embodiments. A pollution map may include, for example, data indicating the degree of pollution for each location in a map corresponding to a place in which the robot cleaner 100 is located.

The robot cleaner 100 may perform cleaning (e.g., suctioning of dust/foreign substances) while traveling around each section of the place in which the robot cleaner 100 is located.

Referring to FIG. 1A, while the robot cleaner 100 is located on one point 1' on a map 1 corresponding to the place, the robot cleaner 100 may perform suctioning, etc. and at the same time, identify the degree of pollution of the area including the point 1'.

For example, the robot cleaner 100 may determine the degree of pollution of the area through a pollution sensor provided on the robot cleaner 100. The pollution sensor may be provided as various sensors such as, for example, and without limitation, an optical sensor, a piezoelectric sensor, an acceleration sensor, etc. and provided on the outer surface or the inside of the robot cleaner 100. The robot cleaner 100 may identify the amount of foreign substances to be suctioned into the robot cleaner 100, the amount of foreign substances being suctioned into the robot cleaner 100, or the amount of foreign substances suctioned into the robot cleaner 100 using sensing data received through the pollution sensor. The robot cleaner 100 may determine the degree of pollution of the area based on the identified amount of foreign substances. Various embodiments related to the pollution sensor will be described in greater detail below with reference to the pollution sensor 160 in FIG. 9.

Referring to FIG. 1A, the robot cleaner 100 may identify the amount of foreign substances in the area including the point 1' as 'a lot,' and as a result of this, the robot cleaner 100 may acquire a pollution map 2 including information that the degree of pollution of the area 2' is high on the map 1.

As described above, the robot cleaner 100 may acquire a pollution map 2 each time through the pollution sensor, etc.

Figure 1B:
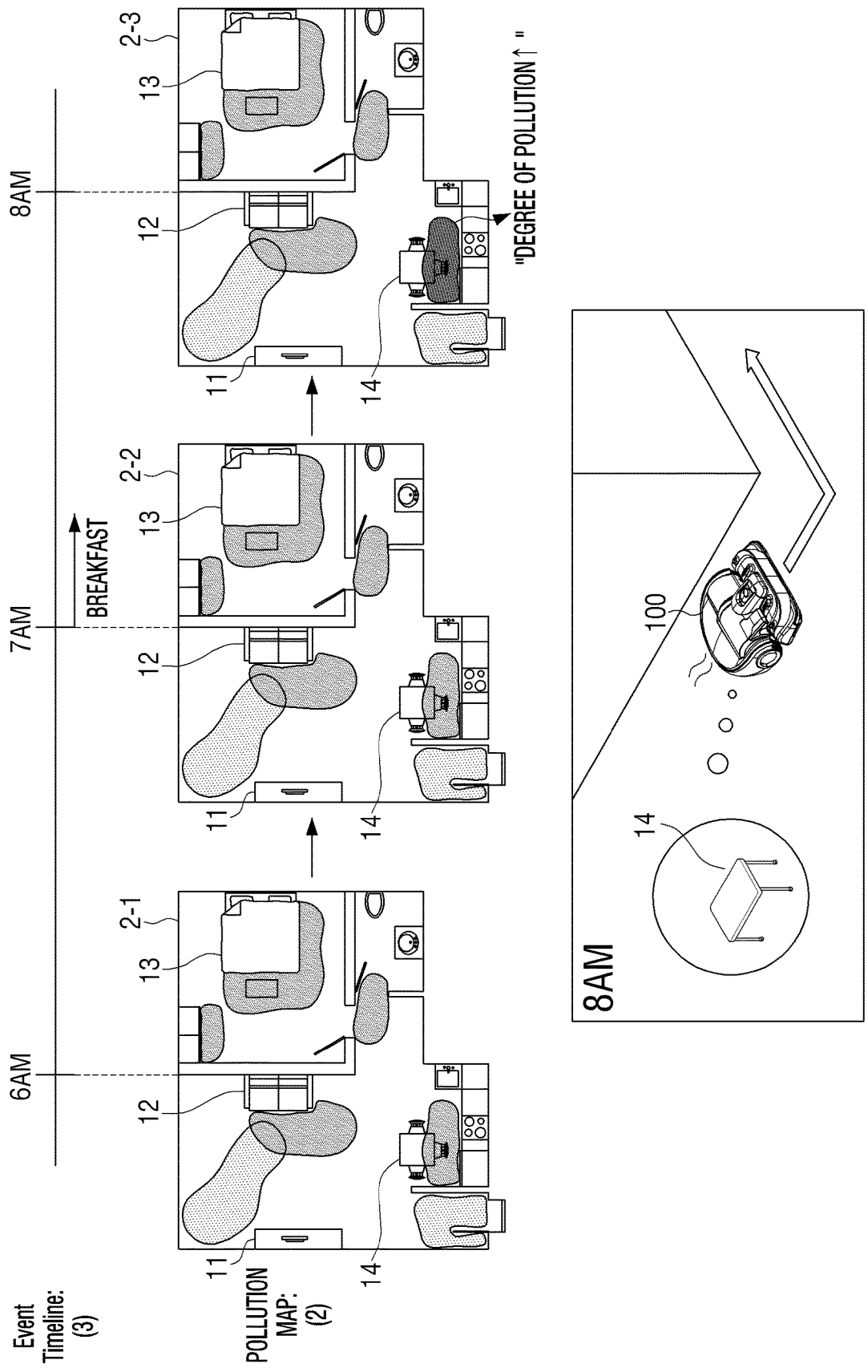
FIG. 1B is a diagram illustrating an example in which a robot cleaner determines a pollution source corresponding to a specific event according to various embodiments.

FIG. 1B is a diagram illustrating an example in which a robot cleaner determines a pollution source corresponding to a specific event according to various embodiments.

Referring to the event timeline 3 in FIG. 1B, 'breakfast' starts at 7 a.m. The event timeline 3 may refer, for example, to information on various events that occurred for each time or information wherein information on the time when one or more events respectively occurred is stored in a temporal order, and it may be stored inside the robot cleaner 100.

For convenience of understanding, on the pollution map 2 in FIG. 1B, the locations of a plurality of objects 11, 12, 13, 14 located on the map are illustrated together. Information on the locations of the plurality of objects may be included in the pollution map 2 as in FIG. 1B or stored in the robot cleaner 100 separately from the pollution map 2.

On the pollution maps 2-1, 2-2, 2-3 in FIG. 1B, areas having a higher degree of pollution are displayed to be darker.

Referring to FIG. 1B, compared to the pollution maps 2-1, 2-2 at 6 a.m. and 7 a.m., the degree of pollution of the pollution map 2-3 at 8 a.m. is relatively increased. For example, the degree of pollution around 'the dining table' 14 increased greatly.

In this case, based on the event timeline 1 and the pollution map 2, the robot cleaner 100 may identify that the pollution source corresponding to the 'breakfast' event is 'the dining table' 14.

Thereafter, every 8 a.m. when a specific time (e.g., one hour) has passed from 7 a.m. when the 'breakfast' event occurred, the robot cleaner 100 may set a moving path centered on the surroundings of 'the dining table' which is identified a pollution source mapped to the 'breakfast' event and perform cleaning.

As described above, the robot cleaner 100 according to the disclosure may determine a pollution source mapped to an event by itself and select an optimal moving path that suits the time point of occurrence of the event. As a result, the moving line of the robot cleaner 100 is optimized and/or improved, and the cleaning function may also be intensified.

Hereinafter, example operation of the robot cleaner 100 will be described in greater detail with reference to the drawings.

Figure 2:
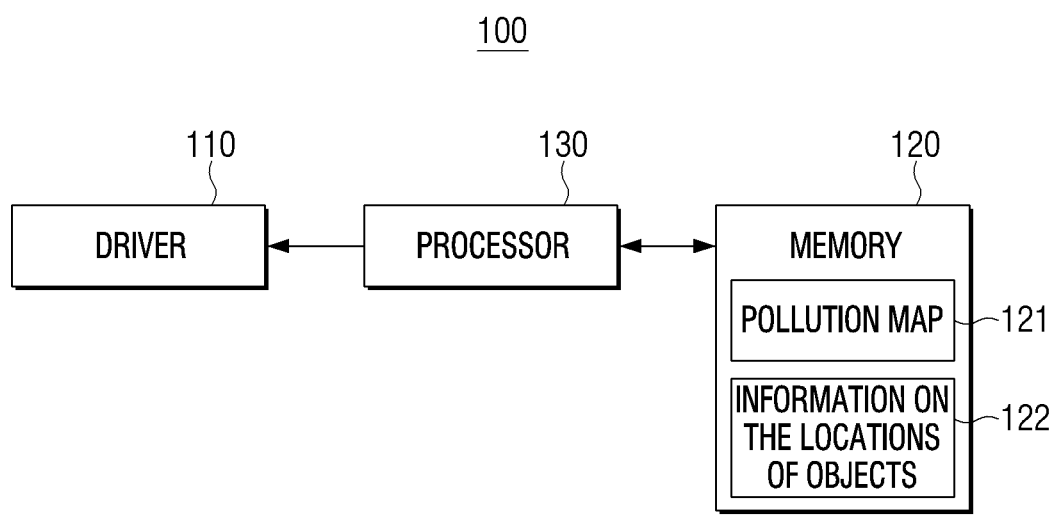
FIG. 2 is a block diagram illustrating an example configuration of a robot cleaner according to various embodiments.

FIG. 2 is a block diagram illustrating an example configuration of the robot cleaner 100 according to various embodiments.

Referring to FIG. 2, the robot cleaner 100 may include a driver (e.g., a drive motor and associated elements that cause movement of the robot cleaner) 110 which may be referred to hereinafter as a drive motor for simplicity of description, a memory 120, and a processor (e.g., including processing circuitry) 130.

In the memory 120, a pollution map 121 regarding the degree of pollution for each location in a map corresponding to a place wherein the robot cleaner 100 is located and information 122 on the locations of a plurality of objects on the map may be stored.

The processor 130 may include various processing circuitry and identify a pollution source among the plurality of objects based on the information 122 on the locations of the plurality of objects and the pollution map 121.

The information 122 on the locations of the plurality of objects may be stored in advance, or may be the result of recognition of objects by the robot cleaner 100 reflected on the map stored in the memory 120. For example, the processor 130 may input an image acquired through the camera on the place corresponding to the map into an artificial intelligence model for recognizing objects and identify a plurality of objects. The processor 130 may identify the locations of each of the plurality of identified objects on the place through sensing data received through a sensor for acquiring information on the surrounding environment (e.g., a LIDAR sensor, an ultrasonic sensor, a 3D sensor, etc.) and generate information on the locations. The information on the locations may be stored in forms of locations on the map stored in the memory 120 in advance.

The processor 130 may identify a location on a map wherein the degree of pollution increased using the pollution map 121 each time. The processor 130 may identify an object existing in the location wherein the degree of pollution increased as a pollution source based on the information 122 on the locations of the plurality of objects.

When a predetermined event occurs, the processor 130 may identify a pollution source corresponding to the event among the plurality of objects based on the information 122 on the locations of the plurality of objects and the pollution map 121.

A predetermined event may include various events that become factors for increasing the degree of pollution of the place wherein the robot cleaner 100 is located. For example, if the place wherein the robot cleaner 100 is located is 'a home,' various events such as 'breakfast/lunch/dinner,' 'cooking,' 'pet food,' 'indoor exercise,' 'ventilation,' etc. may be included in the predetermined event.

The processor 130 may acquire the starting/finishing time point of a specific event through a user input and construct an event timeline. For example, the robot cleaner 100 may receive an input of information that 'ventilation' is performed from 10 a.m. to 11 a.m. from a user. As another example, the robot cleaner 100 may receive an input of information that 'indoor exercise' starts (now) from a user. A user input may be directly received at the robot cleaner 100, but information on a user input received through an external terminal device, etc. may be received at the robot cleaner 100.

The processor 130 may acquire a pollution map related to a time point when an event occurred.

The processor 130 may acquire a pollution map related to a time point when an event occurred among pollution maps acquired for each time through a pollution sensor, etc. provided on the robot cleaner 100 or acquire a pollution map related to a time point when an event occurred among pollution maps received from an external device.

For example, the processor 130 may acquire a pollution map during the time section including a time point when an event occurred. In this case, the processor 130 may acquire a pollution map until a predetermined time period passed from the time point when the event occurred or until a predetermined time period passed from a specific time point before the time point when the event occurred.

Based on the acquired pollution map, the processor 130 may identify a location on the map wherein the degree of pollution increased based on the occurrence of the event. Based on the information 122 on the locations of a plurality of objects, the processor 130 may identify the object existing in the location wherein the degree of pollution increased as a pollution source corresponding to the event.

The processor 130 may determine a pollution source corresponding to the event using an artificial intelligence model trained to identify pollution sources for at least one event based on an event timeline and a pollution map.

The processor 130 may control the driver 110 such that the robot cleaner 100 moves based on the location of the identified pollution source on the map.

For example, the processor 130 may set a moving path such that the robot cleaner 100 goes through at least some of areas belonging to a predetermined range from the location of the identified pollution source. While the robot cleaner 100 moves in the set moving path, the processor 130 may perform cleaning by controlling the suctioning part, etc. of the robot cleaner 100.

Within a predetermined time period after the pollution source is identified, the processor 130 may control the driver 110 such that the robot cleaner 100 is caused to move based on the location of the identified pollution source. In addition, the processor 130 may control the robot cleaner 100 to perform cleaning through the suctioning part, etc. at the same time as moving.

In case the event occurs again later, the processor 130 may control the driver 110 such that the robot cleaner 100 moves based on the location of the pollution source. The processor 130 may control portions of the robot cleaner 100 such as the suctioning part and clean the moving path of the robot cleaner 100.

The processor 130 may control the driver 110 such that the robot cleaner 100 moves to the moving path after the event is finished.

In case the finishing time point of the event on the event timeline is not clear, the processor 130 may control the driver 110 such that the robot cleaner 100 moves to the moving path at a specific time point after the time point when the event occurred.

The specific time point may, for example, be a time point when the degree of pollution does not increase greatly any more after the degree of pollution on the pollution map increased according to the occurrence of the event. For example, the specific time point may be a time point when the speed of increase of the degree of pollution on the pollution map was maintained as much as a threshold time in a state of being lower than a threshold value after the time point of occurrence of the event in the past.

For example, a case where there is a history that the degree of pollution on the pollution map continuously increased by greater than or equal to a specific value after 'breakfast' started at 7 a.m., and from 8 a.m., the degree of pollution on the pollution map increased by lower than the specific value is assumed. If 'breakfast' starts at 7 a.m. on another day afterwards, the processor 130 may control the driver 110 such that the robot cleaner 100 moves to the moving path from 8 a.m.

It is possible that the processor 130 controls the driver 110 such that the robot cleaner 100 moves to the moving path from a specific time point before the event is finished after it occurred.

The driver 110 may refer, for example, to a component or collection of components configured to move or cause movement of the robot cleaner 100. The driver 110 may be implemented in various forms such as, for example, and without limitation, a drive motor, a wheel, a wing, a propeller, etc., and may include an actuator, etc. for implementing physical driving based on electric energy.

In the memory 120, various information related to the functions of the robot cleaner 100 may be stored. The memory 120 may include, for example, and without limitation, a hard disc, an SSD, a flash memory, etc. in addition to a ROM and a RAM.

The processor 130 may include various processing circuitry connected with the driver 110 and the memory 120 and controlling the robot cleaner 100.

Figure 3:
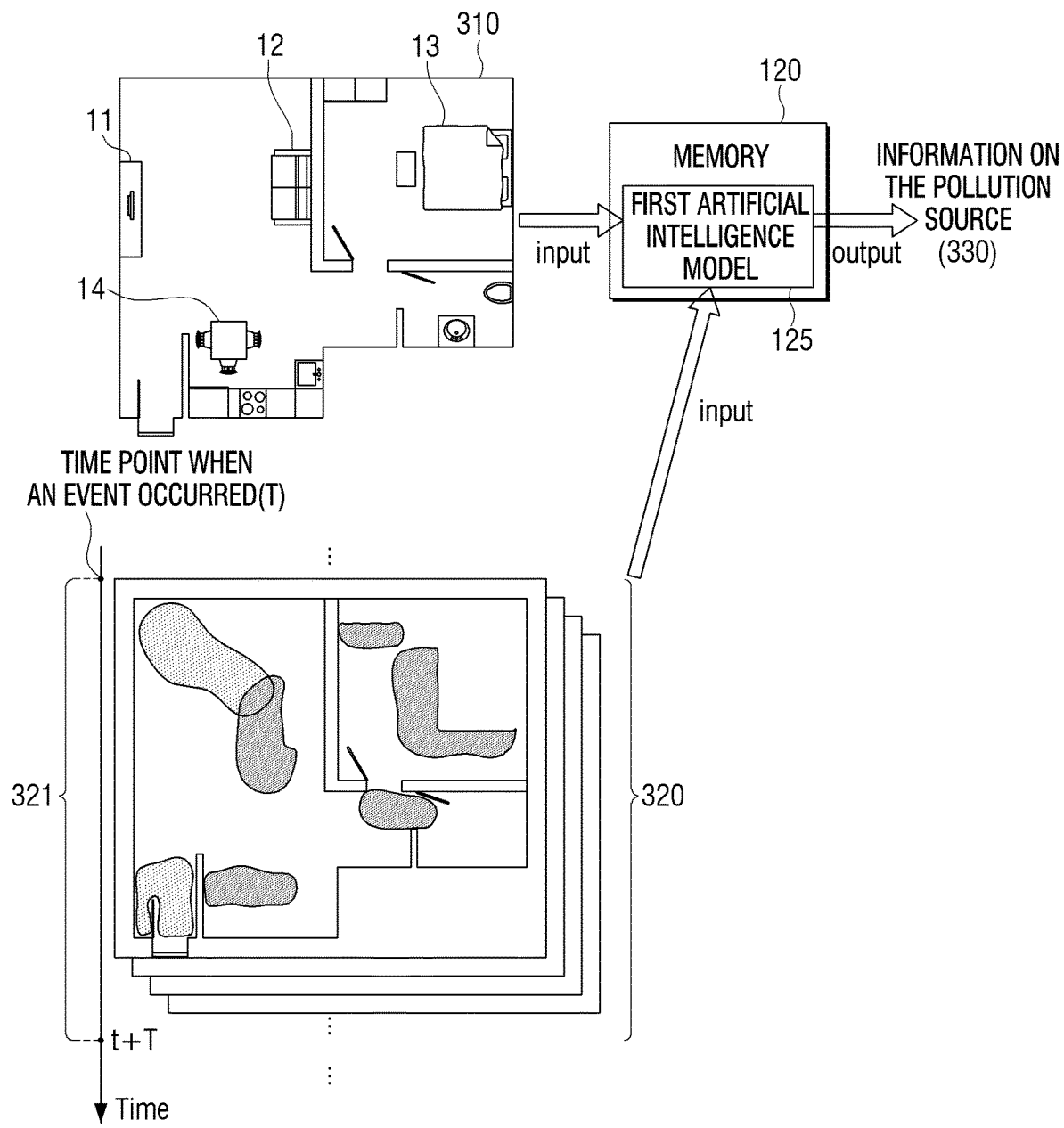
FIG. 3 is a diagram illustrating an example in which a robot cleaner determines a pollution source corresponding to a specific event according to various embodiments.

FIG. 3 is a diagram illustrating an example in which a robot cleaner determines a pollution source corresponding to a specific event according to various embodiments.

Referring to FIG. 3, in the memory 120, a first artificial intelligence model (e.g., including various executable program elements) 125 trained to determine what a pollution source corresponding to an event is may be stored.

The processor 130 may input information on the locations of a plurality of objects and a pollution map related to a time point when an event occurred into the first artificial intelligence model 125 and determine a pollution source corresponding to the event.

Referring to FIG. 3, the processor 130 may input information 310 regarding locations of each of the objects such as a TV 11, a sofa 12, a bed 13, a dining table 14, etc. into the first artificial intelligence model 125. In addition, the processor 130 may input pollution maps 320 during the time section 321 from the time point t when an event occurred to a predetermined time point t+T after the event was finished into the first artificial intelligence model 125.

As a result, the first artificial intelligence model 125 may output information 330 on a pollution source corresponding to the event among the plurality of objects 11, 12, 13, 14. Information 330 on the pollution source may include, for example, and without limitation, the name, kind, location, etc. of the pollution source.

Even though only the pollution maps 320 from the time point t when an event occurred to a predetermined time point t+T after the event was finished are input into the first artificial intelligence model 125 through FIG. 3, the pollution maps 320 from a time point before the time point t when an event occurred to the predetermined time point t+T may be input into the first artificial intelligence model 125.

FIG. 3 illustrates an example including minimal input data for determining a pollution source corresponding to a specific event was specified. However, it will be understood that the first artificial intelligence model 125 may be trained to determine a pollution source based on complex input data in a larger amount.

As an example, the first artificial intelligence model 125 may receive inputs of all information regarding event timelines for various events that occurred during a time period of a week or a month or longer, pollution maps during the time period, and locations of a plurality of objects, and may be trained to determine at least one pollution source corresponding to each of the plurality of events based on the information.

In this case, the same event (e.g., breakfast, bathing a puppy, ventilation, etc.) may occur repetitively a plurality of times during the time period, and thus the first artificial intelligence model 125 may determine a pollution source corresponding to the event based on pollution maps of various cases derived from the same event. As a result, the accuracy of determination of the pollution source based on the first artificial intelligence model 125 can be improved.

FIGS. 4A, 4B, 4C and 4D are diagrams for illustrating another example in which a robot cleaner determines a pollution source corresponding to a specific event according to various embodiments.

The processor 130 may determine a location on the map wherein the degree of pollution increased by greater than or equal to a threshold value after a time point when an event occurred based on the pollution map. For example, referring to FIG. 4A, the processor 130 may compare the pollution maps 410, 420 before and after 'TV watching' and identify an area 421 wherein the degree of increase of the degree of pollution is greater than or equal to a threshold value.

In this case, the processor 130 may input an image acquired through the camera in the determined location into the second artificial intelligence model and identify at least one object. The second artificial intelligence model is stored in the memory 120, and it may be trained to identify at least one object included in an image when an image is input.

Figure 4A:
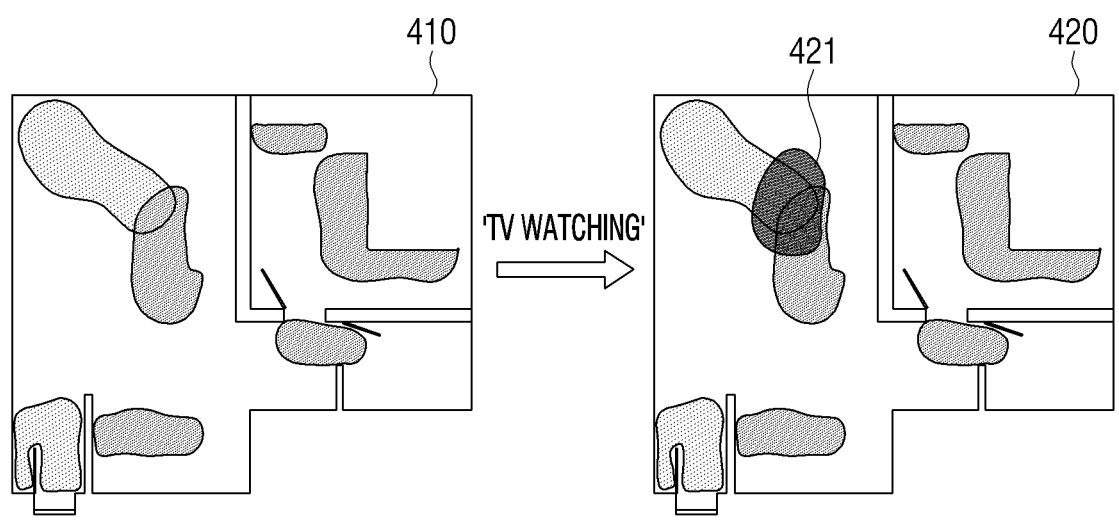
FIG. 4A is a diagram illustrating an example in which a robot cleaner determines a pollution source corresponding to a specific event according to various embodiments.
Figure 4B:
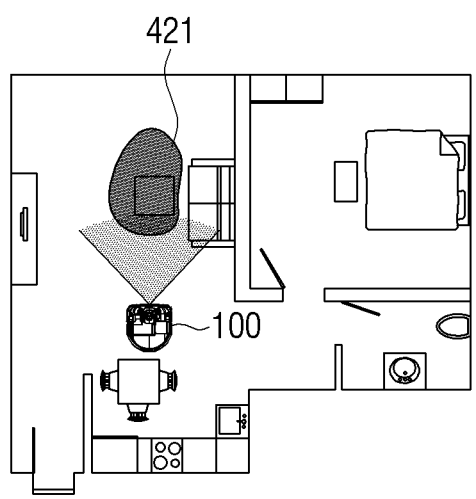
FIG. 4B is a diagram illustrating an example in which a robot cleaner determines a pollution source corresponding to a specific event according to various embodiments.
Figure 4C:
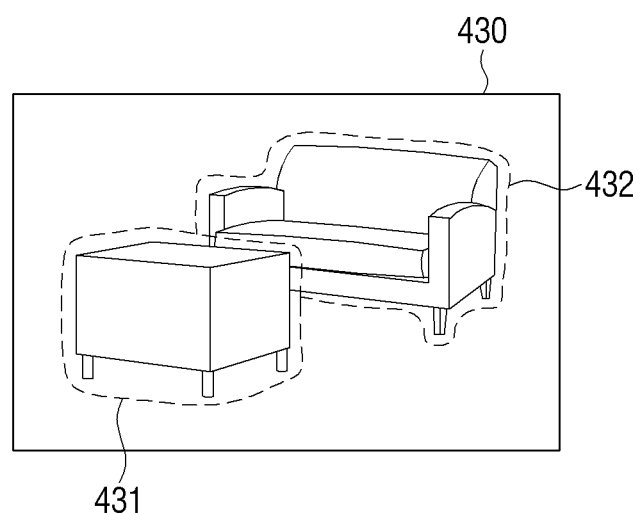
FIG. 4C is a diagram illustrating an example in which a robot cleaner determines a pollution source corresponding to a specific event according to various embodiments.

For example, referring to FIG. 4B and FIG. 4C, the processor 130 may acquire an image 430 for at least one object existing in the area 421 through the camera of the robot cleaner 100, input the acquired image 430 into the second artificial intelligence model and identify objects (the table 431, the sofa 432) existing in the area 421 or around the area 421.

The processor 130 may determine at least one of the identified objects as a pollution source corresponding to the event occurred.

The processor 130 may generate or update event-pollution source mapping information based on information on the determined pollution source. The event-pollution source mapping information includes information on pollution sources respectively mapped to one or more events, and it may be stored in the memory 120.

Referring to FIG. 4D, the processor 130 may identify both of the identified table 431 and sofa 432 as pollution sources mapped to the 'TV watching' event, and update the mapping information 441 based on this. As a result, 'the table' and 'the sofa' are mapped to the 'TV watching' event on the updated mapping information 442.

In case the 'TV watching' event occurs again later, the processor 130 may identify that the pollution sources are 'the table' and 'the sofa' based on the mapping information 442, and control the driver 110 such that the robot cleaner 100 moves based on the locations of the identified 'table' and 'sofa' on the map.

Referring to FIG. 3 described above, in case a pollution source corresponding to a specific event is determined, mapping information can be updated based on information on the determined pollution source as in FIG. 4D.

Even though information on a pollution source is described as texts such as 'the dining table,' 'the window,' 'the flow pot,' 'the table,' 'the sofa,' etc. in FIG. 4D, information in different forms such as an image wherein each of the aforementioned pollution sources is photographed, etc. may be included in the mapping information.

Even though the robot cleaner 100 moved to a location wherein the degree of pollution increased by greater than or equal to a threshold value (e.g., the area 421) and identified objects existing in the location (e.g., 431, 432) in FIG. 4B and FIG. 4C, it is also possible that the robot cleaner 100 identifies objects existing in the location using information on the locations of a plurality of objects stored in the memory 120, and identifies the identified objects directly as pollution sources.

The processor 130 may generate or update the map of the place wherein the robot cleaner is located. The processor 130 may store the map in the memory 120. The map may refer, for example, to data showing the physical topography of the place wherein the robot cleaner 100 is driven. The map may be stored in the form of, for example, an image or in the form of sensing data of at least one sensor provided on the robot cleaner 100, but is not limited thereto.

Figure 5A:
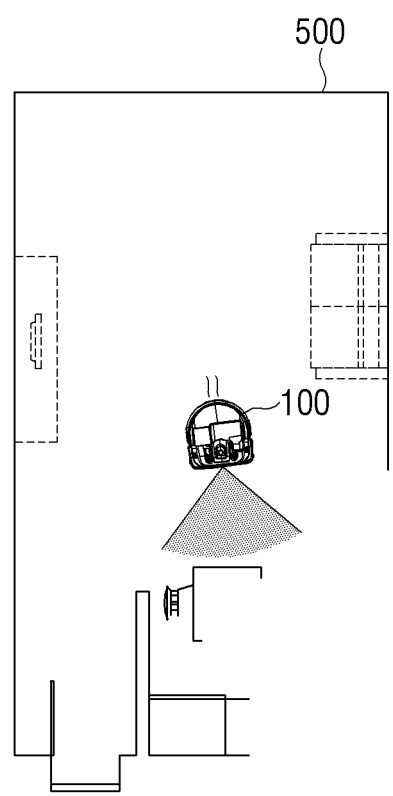
FIG. 5A is a diagram illustrating an example in which a robot cleaner generates a map of a specific place, and generates information on the locations of a plurality of objects on the map according to various embodiments.
Figure 5B:
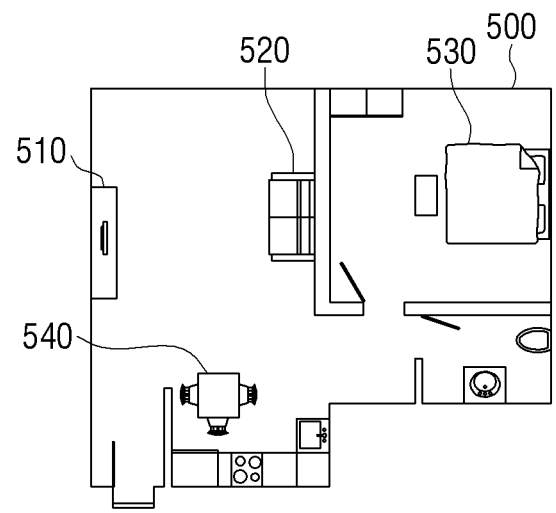
FIG. 5B is a diagram illustrating an example in which a robot cleaner generates a map of a specific place, and generates information on the locations of a plurality of objects on the map according to various embodiments.

FIGS. 5A and 5B are diagrams illustrating an example in which a robot cleaner generates a map of a specific space, and generates information on the locations of a plurality of objects on the map according to various embodiments.

Referring to FIG. 5A, the processor 130 may acquire information on the structure of the place wherein the robot cleaner 100 is located based on sensing data received from the sensor for acquiring information on the surroundings of the robot cleaner 100 such as, for example, and without limitation, a LIDAR sensor, an ultrasonic sensor, a 3D sensor, etc. The processor 130 may generate a map 500 based on the acquired information on the structure.

In addition, the processor 130 may input an image acquired through the camera in the space indicated by the map 500 into the second artificial intelligence model trained to identify objects and identify the objects in the place.

The processor 130 may generate information 122 (refer to FIG. 2) for the locations of the plurality of objects based on sensing data for the identified objects acquired from the sensor. For example, the processor 130 may compare sensing data used for generating the map and sensing data for the surroundings of the identified objects and identify the locations of the objects on the map.

As a result, referring to FIG. 5B, the processor 130 may identify the locations of the identified objects (e.g., the TV 510, the sofa 520, the bed 530, the dining table 540, etc.) on the map 500, and generate information 122 on the locations of the plurality of objects on the map based on the identified locations.

As described above, as a result of the processor 130 generating and updating a map, information on the locations of a plurality of objects, etc. automatically, the robot cleaner 100 can cope with changes of the surrounding environment such as a user's moving or remodeling quickly.

FIG. 6A, 6B, 6C and FIG. 6D are diagrams illustrating an example operation of a robot cleaner in case the location of a pollution source is changed according to various embodiments.

Figure 6A:
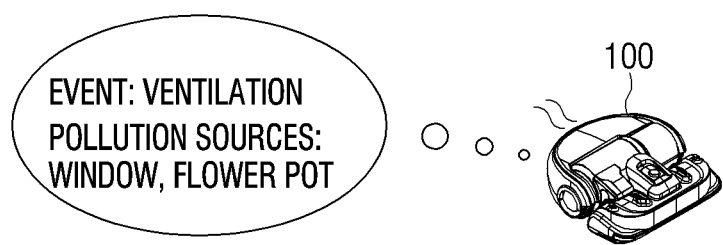
FIG. 6A is a diagram illustrating an example operation of a robot cleaner in case the location of a pollution source is changed according to various embodiments.

Referring to FIG. 6A, in case a 'ventilation' event occurs, the processor 130 of the robot cleaner 100 may identify that the pollution sources are 'the window' 610 (refer to FIG. 6B) and 'the flower pot' 620 (refer to FIG. 6B) through event-pollution source mapping information stored in the memory 120.

In this case, the processor 130 may determine the locations of 'the window' and 'the flow pot' using the information 122 on locations, and control the driver 110 such that the robot cleaner 100 moves to the locations.

Figure 6B:
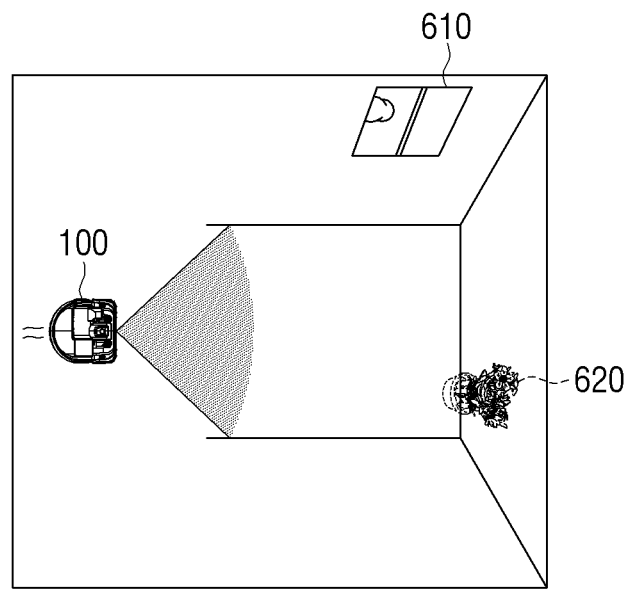
FIG. 6B is a diagram illustrating an example operation of a robot cleaner in case the location of a pollution source is changed according to various embodiments.
Figure 6C:
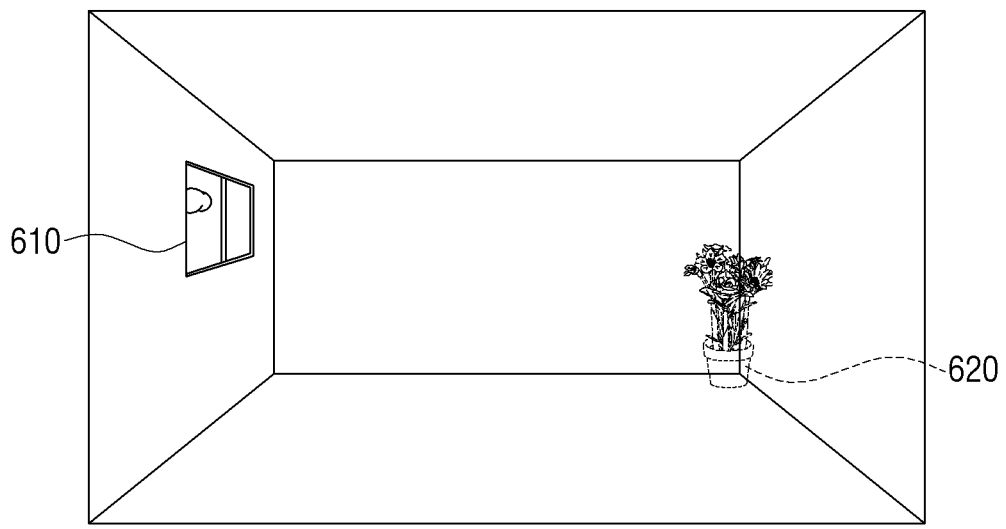
FIG. 6C is a diagram illustrating an example operation of a robot cleaner in case the location of a pollution source is changed according to various embodiments.

Referring to FIG. 6B, as a result of the location of the flower pot 620 being changed by a user, the flower pot 620 may not exist in 'the location of the flower pot' indicated by the information 122 on locations. Referring to FIG. 6C, the processor 130 may identify that the flower pot 620 does not exist in the location through the sensing data of the sensor and/or an image of the camera.

Figure 6D:
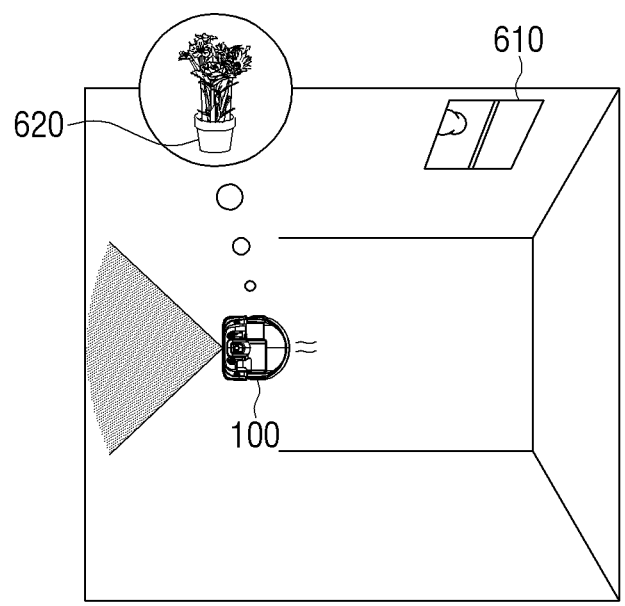
FIG. 6D is a diagram illustrating an example operation of a robot cleaner in case the location of a pollution source is changed according to various embodiments.

Referring to FIG. 6D, the processor 130 may control the driver 110 such that the robot cleaner 100 moves to look for the flower pot 620, and at the same time, search the flower pot 620 through the sensing data received through the sensor and the image acquired through the camera.

In case the flower pot 620 is identified, the processor 130 may update the information 122 on locations based on the changed location of the flower pot 620.

In case the flower pot 620 is not identified even though the robot cleaner 100 searched all places on the map, the processor 130 may delete 'the flower pot' among the pollution sources mapped to 'ventilation' in the event-pollution source mapping information.

As described above, even if the location of a pollution source is changed or a pollution source does not exist anymore, the information 122 on locations and/or the event-pollution source mapping information may be updated automatically. Accordingly, even if the same event is repeated, a flexible moving path may be selected according to the surrounding environment.

In case the identified pollution source is a movable object, the processor 130 may control the driver 110 such that the robot cleaner 100 moves based on the location to which the identified pollution source moves on the map. The processor 130 may identify the moving path of the pollution source using the sensor and the camera of the robot cleaner 100 and/or identify the moving path of the pollution source based on information received from an external device.

As an example, in case a camera and a sensor for acquiring information on the surrounding environment are provided on the robot cleaner 100, the processor 130 may identify the moving path of the pollution source based on output of the second artificial intelligence model for an image acquired through the camera and sensing data acquired through the sensor.

Figure 7A:
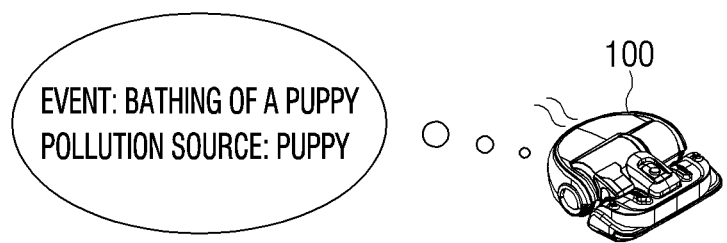
FIG. 7A is a diagram illustrating an example in which a robot cleaner sets a moving path in case a pollution source is a movable object according to various embodiments.
Figure 7B:
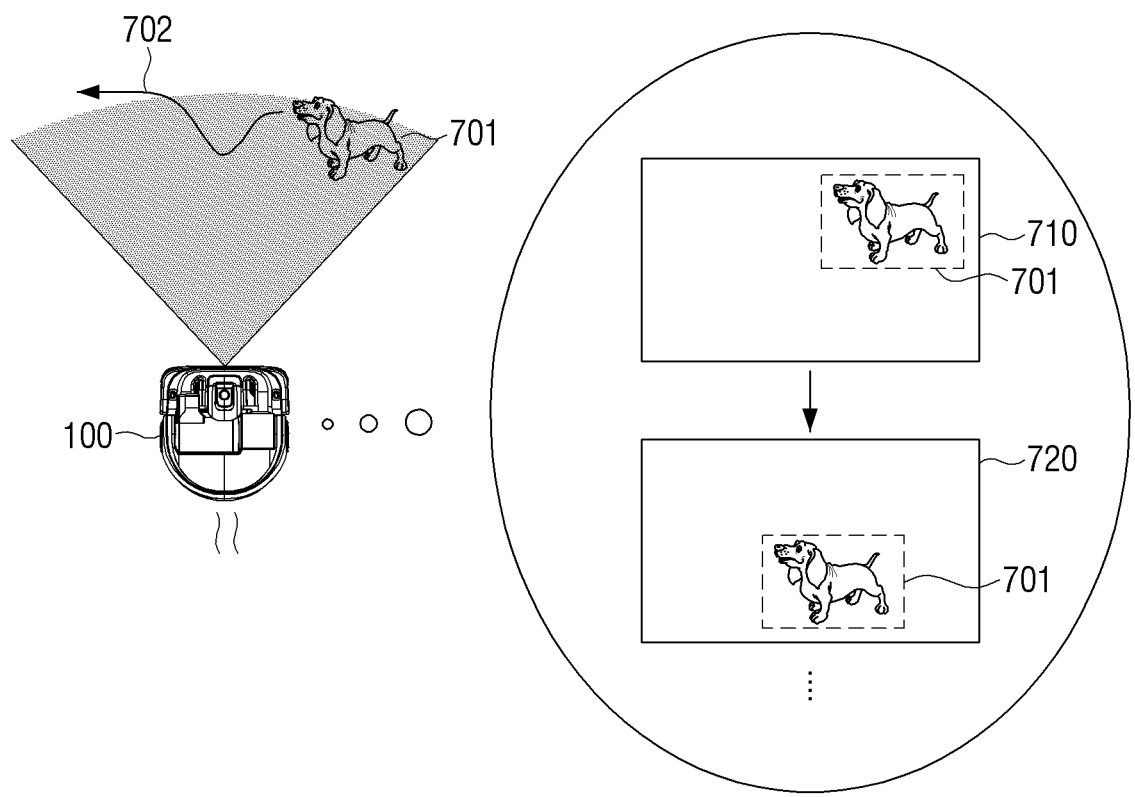
FIG. 7B is a diagram illustrating an example in which a robot cleaner sets a moving path in case a pollution source is a movable object according to various embodiments.
Figure 7C:
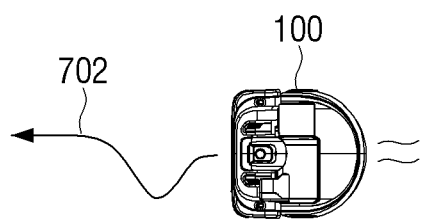
FIG. 7C is a diagram illustrating an example in which a robot cleaner sets a moving path in case a pollution source is a movable object according to various embodiments.

FIG. 7A, 7B and FIG. 7C are diagrams illustrating an example in which a robot cleaner sets a moving path in case a pollution source is a movable object according to various embodiments.

Referring to FIG. 7A, in case a 'bathing of a puppy' event occurs, the processor 130 may identify that the pollution source is 'a puppy' based on the event-pollution source mapping information stored in the memory 120.

Referring to FIG. 7B, the processor 130 may input a plurality of images 710, 720 acquired through the camera into the second artificial intelligence model and identify the puppy 701. The processor 130 may identify the moving path 702 of the puppy 701 using the location of the puppy 701 in the plurality of images 710, 720 and sensing data for the puppy 701 received from the sensor. The moving path 702 may include a plurality of locations on the map.

Referring to FIG. 7C, the processor 130 may control the driver 110 such that the robot cleaner 100 moves according to the identified moving path 702.

The processor 130 may identify the moving path of the pollution source based on information on the location of the pollution source received from an external device through, for example, a communicator.

For example, if an image or sensing data for the puppy 701 is received from one or more sensors or cameras installed in the place wherein the robot cleaner 100 is located, the processor 130 may identify the location of the puppy 701 based on the received image and sensing data.

In this case, the processor 130 may control the driver 110 such that the robot cleaner 100 moves to the location wherein the puppy 701 is located, and after the robot cleaner 100 approached the puppy 701, the processor 130 may operate as in the examples of FIG. 7A, 7B and FIG. 7C and set the moving path of the robot cleaner 100 according to the moving path of the puppy 701.

The processor 130 may identify which event is an event that increases the degree of pollution based on an event timeline and a pollution map 121.

For example, the processor 130 may identify at least one event that increases the degree of pollution of the pollution map 121 by greater than or equal to a threshold value among at least one event occurred based on information on the time when at least one event occurred (e.g., event timeline) in one time section and the pollution map 121 during the time section.

In this case, the processor 130 may identify a pollution source corresponding to the identified event. For example, the processor 130 may identify a pollution source mapped to the identified event among the plurality of objects based on the information 122 on the locations of the plurality of objects and the pollution map 121 related to the time point when the identified event occurred.

For example, in case various events such as 'cooking,' 'TV watching,' 'sleeping,' etc. occurred at least once respectively for a week, but the degree of pollution of the pollution map 121 increased by greater than or equal to a threshold value right after the 'cooking' event, the processor 130 may identify that the 'cooking' event is an event that increases the degree of pollution.

The processor 130 may identify the location on the map in which the degree of pollution increased according to the 'cooking' event, and identify objects existing in the location (e.g., a sink, an oven, a refrigerator, etc.) as pollution sources. When a time point when the 'cooking' event occurs again (or after a specific time period from the time point) comes, the processor 130 may control the driver 110 such that the robot cleaner 100 moves based on the locations of the objects identified as pollution sources.

Figure 8:
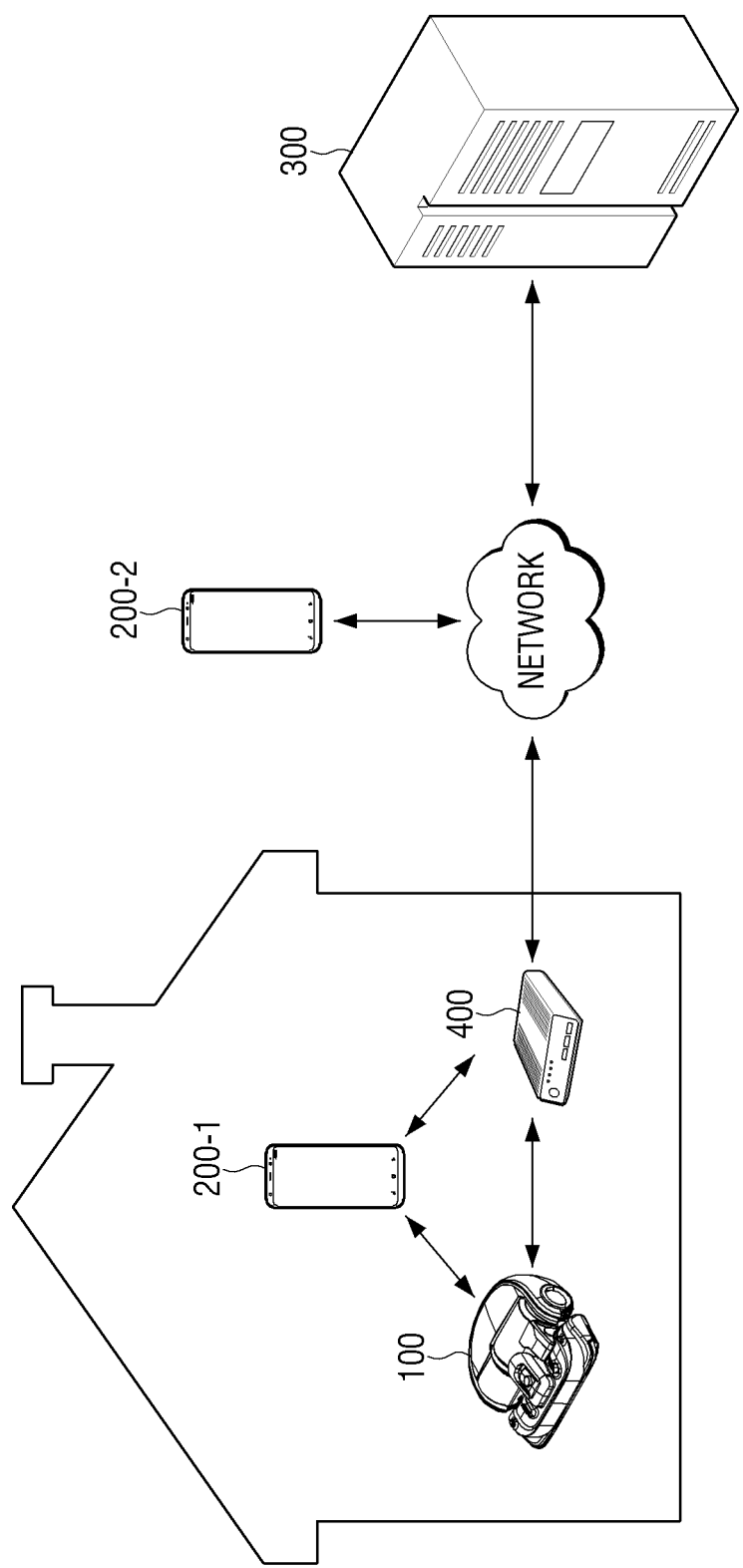
FIG. 8 is a diagram illustrating an example of a robot cleaner that sets a moving path based on communication with external devices including a server device and an external terminal device according to various embodiments.

FIG. 8 is a diagram illustrating an example of a robot cleaner that sets a moving path based on communication with external devices including a server device and an external terminal device according to various embodiments.

Referring to FIG. 8, the robot cleaner 100 may perform communication with external devices such as, for example, and without limitation, smartphones 200-1, 2 and a server device 300. In this case, the electronic device 100 may perform communication with the external devices 200-1, 200-2, 300 through a repeater device 400 including, for example, a router, etc.

The robot cleaner 100 may identify the occurring/finishing time point of an event according to information received from the external device 200-1 or the external device 200-2. For example, information on the occurring/finishing time point of an event that a user input into the external device 200-1 or the external device 200-2 may be received at the robot cleaner 100.

The robot cleaner 100 may transmit information on the pollution map 121 acquired in real time and/or information on the location of the robot cleaner 100 on the map to the external device 200-1 and/or the external device 200-2. The robot cleaner 100 may transmit information on the event timeline 123 to the external device 200-1 and/or the external device 200-2.

In addition to the above, the robot cleaner 100 may, for example, and without limitation, transmit information on the moving paths of the robot cleaner 100 for each time in the past, information on the expected moving paths of the robot cleaner 100 for each time according to event timelines and pollution sources, information on the suctioning amount of foreign substances of the robot cleaner 100 for each time, information on the expected result of the suctioning amount of foreign substances of the robot cleaner 100 for each time, information on the used amount/remaining amount of the battery by the robot cleaner 100, information on the expected used amount/remaining amount of the battery by the robot cleaner 100, information on the types/locations of pollution sources corresponding to an event that is currently proceeding, etc. to the external device 200-1 and/or the external device 200-2.

The external device 200-1 or the external device 200-2 may output the received various information visually/acoustically and provide the information to the user.

An artificial intelligence model trained to determine pollution sources may be stored in the server device 300.

In this case, the robot cleaner 100 may transmit information on the event timeline and the pollution map 121 to the server device 300. The server device 300 may transmit information on the location on the map wherein the degree of pollution increased according to occurrence of the event to the robot cleaner 100.

In this case, the robot cleaner 100 may move to the location and acquire an image through the camera, and identify at least one object included in the acquired image.

Then, the robot cleaner 100 may transmit information on the identified at least one object to the server device 300.

The server device 300 may identify a pollution source corresponding to the event occurred among the identified at least one object, and transmit information on the identified pollution source to the robot cleaner 100.

As a result, in case the event occurs again later, the robot cleaner 100 may control the driver 110 such that the robot cleaner 100 moves based on the location of the pollution source.

Figure 9:
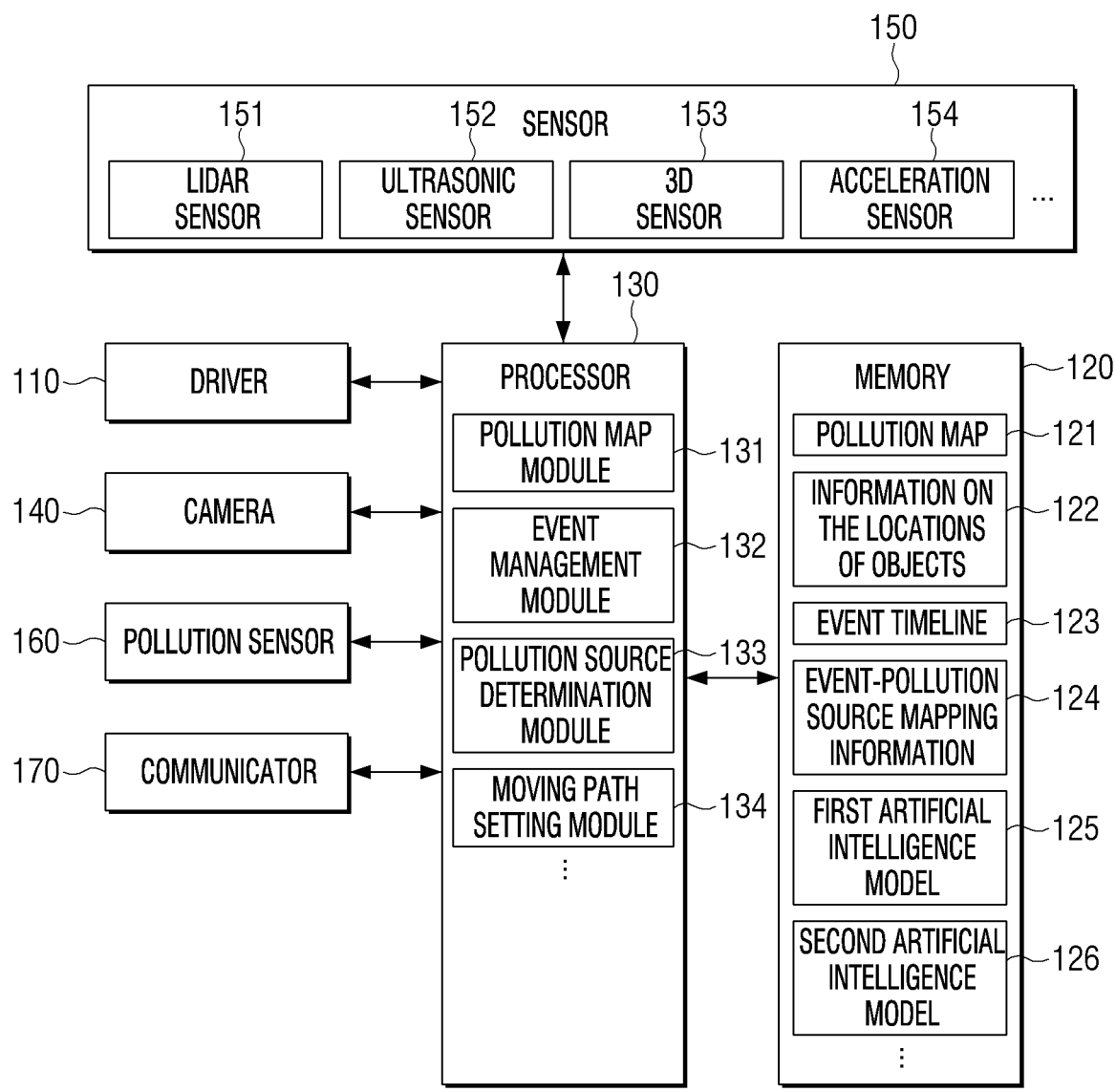
FIG. 9 is a block diagram illustrating an example configuration of a robot cleaner according to various embodiments.

FIG. 9 is a block diagram illustrating an example configuration of a robot cleaner according to the various embodiments.

Referring to FIG. 9, the robot cleaner 100 may further include a camera 140, a sensor 150, a pollution sensor 160, a communicator (e.g., including communication circuitry) 170, etc. in addition to the driver 110, the memory 120, and the processor 130.

In the memory 120, an event timeline 123 and event-pollution source mapping information 124, etc. may be additionally stored in addition to the pollution map 121 and information 122 on the locations of objects.

The event timeline 123 may include information on various events that occurred for each time or information wherein information on the time when one or more events respectively occur/end is stored in a temporal order.

In the event-pollution source mapping information 124 may include information on pollution sources mapped to each event is included, as described above.

In addition, in the memory 120, one or more artificial intelligence models including, for example, executable program elements, such as a first artificial intelligence model 125 trained to determine pollution sources and a second artificial intelligence model 126 trained to identify objects, etc. may be stored.

For example, in a storage such as a hard disc or an SSD, etc. in the memory 120, one or more artificial intelligence models may be stored.

The functions of the stored artificial intelligence models may be performed through the processor 130 and the memory 120.

For this, the processor 130 may include, for example, and without limitation, one or a plurality of processors. The one or plurality of processors may include generic-purpose processors such as, for example, and without limitation, a CPU, a dedicated processor, an AP, a digital signal processor (DSP), etc., graphic-dedicated processors such as a GPU, a vision processing unit (VPU), etc., artificial intelligence-dedicated processors such as an NPU, or the like.

The one or plurality of processors may perform control to process input data according to predefined operation rules or artificial intelligence models stored in the memory 120. In case the one or plurality of processors are artificial intelligence-dedicated processors, the artificial intelligence-dedicated processors may be designed in a hardware structure specialized for processing of a specific artificial intelligence model.

The predefined operation rules or artificial intelligence models are characterized in that they are made through learning. Being made through learning may refer, for example, to predefined operations rules or artificial intelligence models having desired characteristics being made by applying a learning algorithm to a plurality of learning data. Such learning may be performed in a device itself wherein artificial intelligence is performed according to the disclosure, or through a separate server/system.

As non-limiting examples of learning algorithms, there are supervised learning, unsupervised learning, semi-supervised learning, reinforcement learning, or the like, but learning algorithms are not limited to the aforementioned examples.

An artificial intelligence model may include a plurality of neural network layers. Each of the plurality of neural network layers may include a plurality of weight values, and may perform a neural network operation through an operation between the operation result of the previous layer and the plurality of weight values. The plurality of weight values that the plurality of neural network layers have may be optimized by a learning result of an artificial intelligence model. For example, the plurality of weight values may be updated such that a loss value or a cost value acquired from an artificial intelligence model during a learning process is reduced or minimized.

An artificial neural network may include, for example, and without limitation, a deep neural network (DNN), and may include, for example, and without limitation, a convolutional neural network (CNN), a deep neural network (DNN), a recurrent neural network (RNN), a restricted Boltzmann Machine (RBM), a deep belief network (DBN), a bidirectional recurrent deep neural network (BRDNN), deep Q-networks, etc., but the neural network according to the disclosure is not limited to the aforementioned examples excluding specified cases.

The processor 130 may perform various operations by selectively executing/controlling a pollution map module (e.g., including processing circuitry and/or executable program elements) 131, an event management module (e.g., including processing circuitry and/or executable program elements) 132, a pollution source determination module (e.g., including processing circuitry and/or executable program elements) 133, a moving path setting module (e.g., including processing circuitry and/or executable program elements) 134, etc.

Each of these modules may be stored as software on the ROM on the memory 120 or implemented as hardware including circuitry. Each of these modules may be implemented as a form wherein software and hardware are combined.

The pollution map module 131 may include various processing circuitry and/or executable program elements and generate/update the pollution map 121 stored in the memory 120 for each time based on the sensing data of the pollution sensor 160.

The pollution map module 131 may generate/update the pollution map 121 stored in the memory 120 for each time based on information received from an external device.

The event management module 132 may include various processing circuitry and/or executable program elements and manage information on an event constituting the event timeline 122 stored in the memory 120 or information on the time when the event occurred/ended.

At least a part of the event timeline 123 may be generated/updated based on information that a user input or information received from an external device.

For example, in case a user input information that 'exercise' starts from now into the robot cleaner 100, the event management module 132 may add information that 'exercise' starts at the present time to the event timeline 123.

For example, in case a user input information that 'breakfast' starts at 8 a.m. and ends at 9 a.m. into a smartphone, etc. which is an external device, the information that the smartphone transmitted may be received at the robot cleaner 100 through the communicator 170. In this case, the event management module 132 may add information that from 8 a.m. to 9 a.m. is the time of 'breakfast' to the event timeline 123.

The pollution source determination module 133 may include various processing circuitry and/or executable program elements and determine a pollution source corresponding to at least one event based on the pollution map 121 and the event timeline 123, etc. stored in the memory 120. The processor 130 may operate as in the embodiments of FIG. 3 and FIG. 4A, 4B and FIG. 4C described above through the pollution source determination module 133.

The moving path setting module 134 may include various processing circuitry and/or executable program elements and set a moving path of the driver 110. The moving path setting module 134 may set a moving path based on the current location of the robot cleaner 100 and the location of the pollution source corresponding to the event occurred.

The camera 140 may include a component for acquiring one or more images regarding the surroundings of the robot cleaner 100. The camera 140 may include an RGB camera 121.

The camera 140 may include sensors such as, for example, and without limitation, a charge-coupled device (CCD), a complementary metal-oxide semiconductor (CMOS), etc., but the disclosure is not limited thereto. In case the camera 140 includes a CCD, the CCD may be implemented as a red/green/blue (RGB) CCD, an infrared (IR) CCD, etc.

The processor 130 may input an image acquired through the camera 140 into the second artificial intelligence model 126 and identify at least one object.

The sensor 150 may include a component for acquiring information on the surroundings of the robot cleaner 100.

The sensor 150 may include various sensors, such as, for example, and without limitation, a LIDAR sensor 151, an ultrasonic sensor 152, a 3D sensor 153, an acceleration sensor 154, etc.

The 3D sensor 153 may, for example, be implemented as a depth camera. The depth camera may be implemented as a TOF camera including a time of flight (TOF) sensor and an infrared light. The depth camera may measure depth using disparity of images acquired using a plurality of cameras, and in this case, it may include an IR stereo sensor. Alternatively, the depth camera may be implemented in a structured light method of measuring depth by photographing a light pattern projected by a projector with a camera.

The processor 130 may generate/update a map using various sensing data received through the sensor 110 or generate/update information on locations of one or more objects or pollution sources on a map.

The processor 130 may determine the locations of pollution sources and the robot cleaner 100 on the map based on the various sensing data received through the sensor 110 and set a moving path.

The pollution sensor 160 may include a component for measuring the degree of pollution of the location wherein the robot cleaner 100 is located or the surroundings of the robot cleaner 100. The processor 130 may generate/update the pollution map 121 for each time using the pollution sensor 160.

As an example, the pollution sensor 160 may be implemented as, for example, and without limitation, a light sensor that receives light from the outside of the robot cleaner 100. In this case, whenever the robot cleaner 100 is located on each point on the map, the pollution map module 131 may detect the amount of foreign substances existing in the front side or the surroundings of the robot cleaner 100 based on the sensing data received through the light sensor before the foreign substances were introduced into the robot cleaner 100 and determine the degree of pollution of each point. The pollution map module 131 may generate/update the pollution map 121 through the determined degree of pollution.

As an example, the pollution sensor 160 may be implemented as a light sensor provided on the introduction path of foreign substances inside the robot cleaner 100. The light sensor may include light emitting elements and light receiving elements for receiving light that were emitted from the light emitting elements and passed through the introduction path. In this case, whenever the robot cleaner 100 is located on each point on the map, the pollution map module 131 may detect the amount of foreign substances introduced through the light sensor and identify the degree of pollution of each point. The pollution map module 131 may generate/update the pollution map 121 through the identified degree of pollution.

As an example, the pollution sensor 160 may be implemented as a light sensor for detecting the amount of foreign substances of the place wherein foreign substances introduced into the robot cleaner 100 are accumulated. The light sensor may include light emitting elements and light receiving elements for receiving light that were emitted from the light emitting elements and passed through the place. In this case, whenever the robot cleaner 100 is located on each point on the map, the pollution map module 131 may identify the speed at which foreign substances are accumulated through the sensing data of the light sensor and identify the degree of pollution of each point. The pollution map module 131 may generate/update the pollution map 121 through the identified degree of pollution.

As an example, the pollution sensor 160 may, for example, and without limitation, be implemented as a piezoelectric sensor or an acceleration sensor, etc. attached to a filter wherein foreign substances introduced into the robot cleaner 100 are filtered. In this case, whenever the robot cleaner 100 is located on each point on the map, the pollution map module 131 may identify the amount of suctioned foreign substances using the sensing data of the piezoelectric sensor or the acceleration sensor. The pollution map module 131 may generate/update the pollution map 121 by determining the degree of pollution of each point through the identified amount of foreign substances.

With respect to the pollution sensor 160, various conventional technologies for determining the degree of pollution may be used in addition to the aforementioned examples.

The communicator 170 may include various communication circuitry for the robot cleaner 100 to perform communication with at least one external device and transmit and receive signals/data. For this, the communicator 150 may include circuitry.

The communicator 170 may include, for example, and without limitation, a wireless communication module, a wired communication module, etc.

The wireless communication module may include, for example, and without limitation, at least one of a WIFI communication module, a Bluetooth module, an infrared data association (IrDA) module, a third generation (3G) mobile communication module, a fourth generation (4G) mobile communication module, a fourth generation long term evolution (LTE) communication module, or a fifth generation (5G) mobile communication module for receiving contents from an external server or an external device.

The wired communication module may, for example, and without limitation, be implemented as a wired port such as a thunderbolt port, a USB port, etc.

Although not illustrated in FIG. 9, in the robot cleaner 100, various components such as a user inputter (e.g., including various input circuitry) for receiving instructions/information from a user, a display/a speaker, etc. for outputting information visually/acoustically may be additionally included. The user inputter may be implemented as a microphone, a touch screen, a button, a motion sensor, etc., but is not limited thereto.

A method for operating a robot cleaner according to the disclosure will be described in greater detail below with reference to FIG. 10 to FIG. 11.

Figure 10:
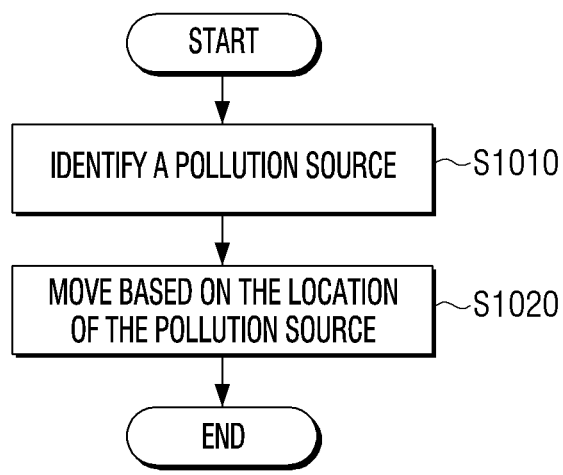
FIG. 10 is a flowchart illustrating an example method for operating a robot cleaner according to various embodiments.

FIG. 10 is a flowchart illustrating an example method for operating a robot cleaner according to various embodiments.

Referring to FIG. 10, in an example operating method according to the disclosure, a pollution source may be identified at operation S1010.

For example, a pollution source among a plurality of objects may be identified based on information on the locations of the plurality of objects and a pollution map.

The pollution map may include information on the degree of pollution for each location on the map corresponding to a place wherein the robot cleaner is located. Also, the information on the locations of the plurality of objects may include information on the locations of the plurality of objects on the map.

In the example operating method according to the disclosure, when a predetermined event occurs, a pollution source corresponding to the event among the plurality of objects may be identified based on the information on the locations of the plurality of objects and the pollution map. A predetermined event may include an event which becomes a factor for increasing the degree of pollution of the place wherein the robot cleaner is located.

The pollution map used for identifying a pollution source may be a pollution map related to the time point when the event occurred.

As an example, in case the first artificial intelligence model trained to determine pollution sources is stored in the memory of the robot cleaner, the information on the locations of the plurality of objects and the pollution map related to the time point when the event occurred may be input into the first artificial intelligence model and a pollution source corresponding to the event may be determined.

As an example, based on the pollution map, a location on the map wherein the degree of pollution increased by greater than or equal to a threshold value after the time point when the event occurred may be determined.

In this case, based on the information on the locations of the plurality of objects, the processor 130 may identify an object existing in the determined location, and determine the identified object as a pollution source.

In case the second artificial intelligence model trained to identify objects is stored in the memory of the robot cleaner, an image acquired in the determined location may be input into the second artificial intelligence model and at least one object may be identified. At least one of the identified objects may be determined as a pollution source corresponding to the identified event.

The mapping information (e.g., event-pollution source mapping information) may be updated such that the identified (determined) pollution source is mapped to the event.

In this case, if the event occurs again, a pollution source corresponding (mapped) to the event may be identified based on the mapping information.

In the example operating method according to the disclosure, the robot cleaner may move based on the location of the identified pollution source at operation S1020. The robot cleaner may perform cleaning while moving based on the location of the identified pollution source within a predetermined time period after the pollution source was identified.

In case the event occurred again later, the robot cleaner may perform cleaning while moving based on the location of the pollution source.

For example, the driver 110 may be controlled such that the robot cleaner 100 moves to at least some areas within a predetermined range from the location of the identified pollution source on the map from the current location of the robot cleaner 100 on the map.

In case the identified pollution source is a movable object, the robot cleaner may move based on the location to which the identified pollution source moves on the map.

In case the second artificial intelligence model trained to identify objects is stored in the memory of the robot cleaner, a map may be generated based on sensing data acquired through the sensor.

In this case, objects may be identified by inputting an image acquired through the camera into the second artificial intelligence model, and information on the locations of the plurality of objects may be generated based on the sensing data for the identified objects acquired from the sensor. The information on the locations may be information on the locations on the map.

Figure 11:
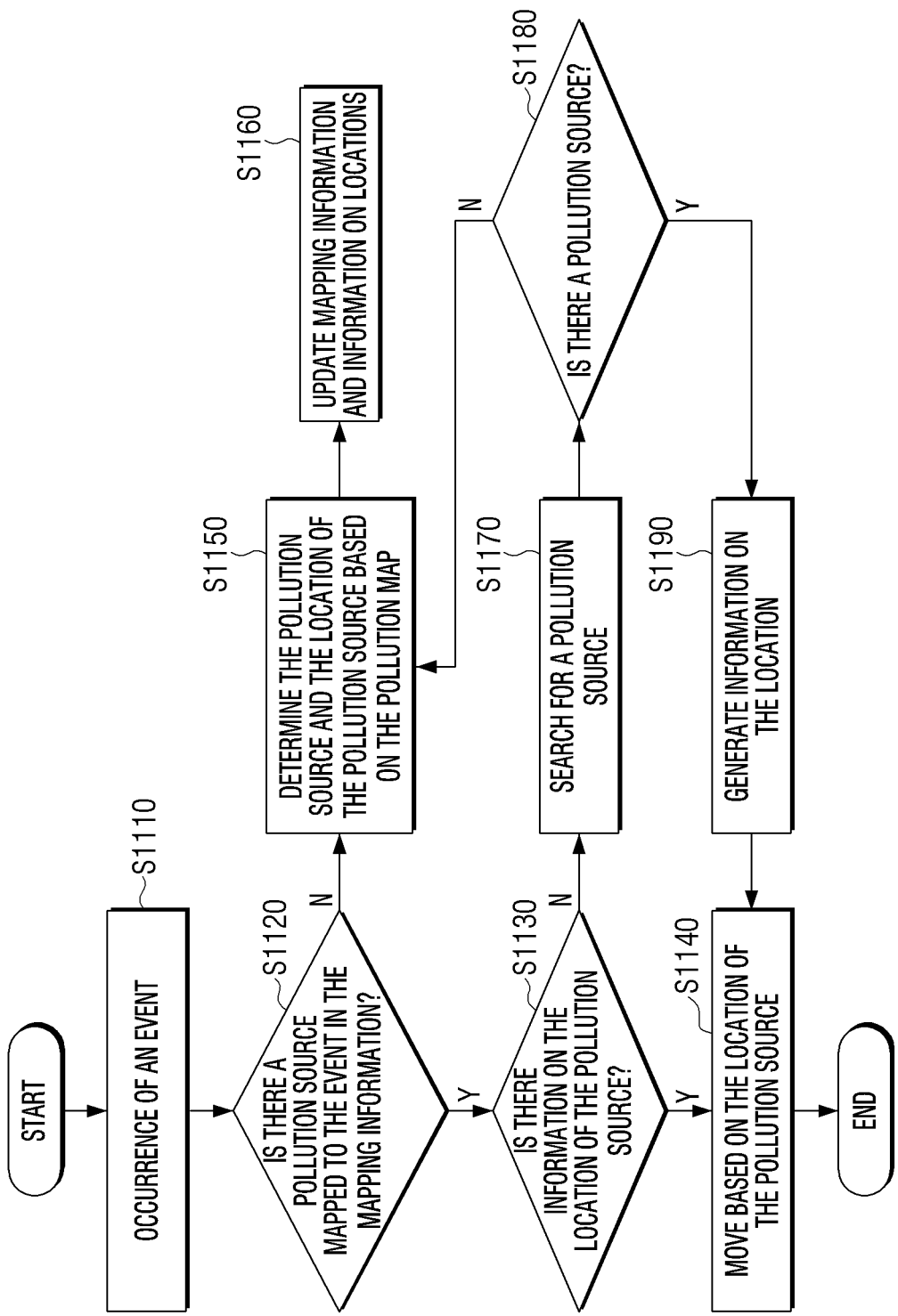
FIG. 11 is a flowchart illustrating an example operating method according to various embodiments.

FIG. 11 is a flowchart illustrating an example operating method according to various embodiments.

Referring to FIG. 11, in case an event occurs at operation S1110, it may be identified whether there is a pollution source mapped to the event in the event-pollution source mapping information stored in the robot cleaner or a communicable external device in advance at operation S1120.

In case there is a pollution source mapped to the event in the event-pollution source mapping information at operation S1120—Y, it may be identified whether information on the location of the pollution source is stored in advance at operation S1130.

In case information on the location of the pollution source is stored in advance at operation S1130—Y, the robot cleaner may perform cleaning such as suctioning, etc. while moving based on the location of the pollution source at operation S1140. If it is identified that the pollution source does not currently exist in the location through the sensor and/or the camera, the changed location of the pollution source may be searched through the sensor and/or the camera.

In case there is no pollution source mapped to the event in the event-pollution source mapping information at operation S1120—N, a pollution source may be determined based on a pollution map related to the time point when the event occurred at operation S1150. For example, a location on the map wherein the degree of pollution increased relatively greatly as the event occurred may be identified through pollution maps for each time during the time section including the time point when the event occurred, and a pollution source existing in the location may be identified.

In this case, the event-pollution source mapping information may be updated based on information on the determined pollution source, and information on the location of the pollution source may be stored at operation S1160.

In case there is information on a pollution source mapped to the event in the event-pollution source mapping information at operation S1120—Y, but there is no information on the location of the pollution source at operation S1130—N, it may be identified whether the pollution source exists in a place on the map, and if the pollution source exists in a place on the map, where the location is, etc. using the sensor and the camera at operation S1170.

In case the pollution source exists in the place at operation S1180—Y, information on the location of the pollution source may be stored at operation S1190, and the robot cleaner may perform cleaning while moving based on the location of the pollution source at operation S1140.

In case the pollution source does not exist in the place at operation S1180—N, a new pollution source may be identified on the pollution map related to the time point when the event occurred at operation S1150.

An example embodiment as illustrated in FIG. 11 is based on the assumption of a case wherein an event that increases the degree of pollution of a place on the map occurred. For example, in case an event occurred is not an event that increases the degree of pollution of a place on the map, the embodiment of FIG. 11 may not be performed.

Information on an event increasing the degree of pollution may be information set by a user or the manufacturer in advance, but it may also be information automatically generated by the operating method according to the disclosure.

For example, in the example operating method according to the disclosure, at least one event that increases the degree of pollution of the pollution map by greater than or equal to a threshold value among at least one event may be identified based on information on the time when at least one event occurred during a time section and the pollution map during the time section. Information on the event that increases the degree of pollution may be generated/updated based on the information on the identified event.

In case an event that increases the degree of pollution is identified, a pollution source corresponding to the identified event among the plurality of objects may be identified based on information on the locations of the plurality of objects and the pollution map related to the time point when the identified event occurred.

The event-pollution source mapping information may be updated such that the identified pollution source is mapped to the identified event. Then, in case the event occurs again later, the pollution source mapped to the event may be identified based on the event-pollution source mapping information, and a moving path may be set based on the location of the pollution source.

The example operating method illustrated and described with reference to FIG. 10 and FIG. 11 above may be performed through the robot cleaner 100 illustrated and described with reference to FIG. 2 and FIG. 9. The operating method illustrated and described with reference to FIG. 10 and FIG. 11 may be performed through a system including the robot cleaner 100 and one or more external devices.

The robot cleaner according to the disclosure has an effect that it can automatically determine a pollution source that increases the degree of pollution of the place wherein the robot cleaner is operated as each event occurs.

The robot cleaner according to the disclosure has an effect that it can construct mapping information on pollution sources for each event, and set an optimal moving path for each of various events based on the information.

In addition, the robot cleaner according to the disclosure can automatically update mapping information and information on the locations of objects even when the locations of objects in a place are changed or a place itself is changed, and set an optimal moving path.

The various example embodiments of the disclosure described above may be implemented in a non-transitory recording medium that is readable by a computer or a device similar thereto, using software, hardware or a combination thereof.

According to implementation by hardware, the embodiments described in the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, an electronic unit for performing various functions, or the like.

In some cases, the embodiments described in this disclosure may be implemented as a processor itself. According to implementation by software, the embodiments such as processes and functions described in this specification may be implemented by separate software modules. Each of the aforementioned software modules can perform one or more functions and operations described in this specification.

Computer instructions for executing the processing operations at the robot cleaner 100 according to the various embodiments of the disclosure described above may be stored in a non-transitory computer-readable medium. Such computer instructions stored in a non-transitory computer-readable medium may make the processing operations at the robot cleaner 100 according to the various embodiments described above performed by a specific device, when they are executed by the processor of the specific machine.

A non-transitory computer-readable medium may refer, for example, to a medium that stores data semi-permanently, and is readable by machines. As specific examples of a non-transitory computer-readable medium, there may be a CD, a DVD, a hard disc, a blue-ray disc, a USB, a memory card, a ROM and the like.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A robot cleaner comprising:
a driver, including a drive motor, configured to cause the robot cleaner to move;
a memory storing information on a plurality of pollution maps corresponding to different time points in an event timeline, the plurality of pollution maps including information on a degree of pollution for each location in a map corresponding to a place in which the robot cleaner is and/or was located and information on locations of a plurality of objects on the map, and a first artificial intelligence model trained to determine pollution sources; and
a processor operatively connected to the driver and the memory and configured to control the robot cleaner,
wherein the processor is configured to:
input the information on the locations of the plurality of objects and the information on a degree of pollution for each location in the map from two or more pollution maps among the plurality of pollution maps related to a time section from a time point when a predetermined event occurs to a predetermined time point after the event was finished into the first artificial intelligence model and determine a pollution source corresponding to the event, and
control the driver to move the robot cleaner based on the location of the identified pollution source on the map.

2. The robot cleaner of claim 1, further comprising:
a camera,
wherein the memory further comprises a second artificial intelligence model trained to identify objects, and
the processor is configured to:
determine a location in which the degree of pollution increased by greater than or equal to a threshold value after the time point when the predetermined event occurred on the map based on the pollution map,
input an image acquired through the camera in the determined location into the second artificial intelligence model and identify at least one object, and
determine at least one of the at least one object as a pollution source corresponding to the event.

3. The robot cleaner of claim 1,
wherein the memory further comprises mapping information wherein a pollution source is mapped to each event, and
the processor is configured to:
map information on the identified pollution source to an event and update the mapping information.

4. The robot cleaner of claim 3,
wherein the processor is configured to:
based on the event occurring again, identify a pollution source mapped to the event based on the mapping information, and
control the driver to move the robot cleaner based on the location of the identified pollution source on the map.

5. The robot cleaner of claim 1, further comprising:
a camera; and
a sensor configured to acquire information on surroundings of the robot cleaner,
wherein the memory further comprises a second artificial intelligence model trained to identify objects, and
the processor is configured to:
generate the map based on sensing data acquired through the sensor,
input an image acquired through the camera into the second artificial intelligence model and identify an object, and
generate information on the locations of the plurality of objects based on the sensing data for the identified object acquired from the sensor.

6. The robot cleaner of claim 1,
wherein the processor is configured to:
based on the identified pollution source being a movable object, control the driver to move the robot cleaner based on a location to which the identified pollution source moves on the map.

7. The robot cleaner of claim 6, further comprising:
a communicator comprising communication circuitry,
wherein the processor is configured to:
identify a moving path of the pollution source based on information on the location of the pollution source received from an external device through the communicator.

8. The robot cleaner of claim 6, further comprising:
a camera; and
a sensor configured to acquire information on surroundings of the robot cleaner,
wherein the memory further comprises a second artificial intelligence model trained to identify objects, and
the processor is configured to:
identify a moving path of the pollution source based on an output of the second artificial intelligence model for an image acquired through the camera and sensing data acquired through the sensor.

9. The robot cleaner of claim 1,
wherein the processor is configured to:
identify at least one event that increases the degree of pollution of the pollution map to greater than or equal to a threshold value among the at least one event based on information on the time when the at least one event occurred in one time section and the pollution map during the time section.

10. The robot cleaner of claim 9,
wherein the processor is configured to:
identify a pollution source corresponding to the identified event among the plurality of objects based on information on the locations of the plurality of objects and the pollution map related to the time point when the identified event occurred.

11. A method for operating a robot cleaner comprising a driver, including a drive motor, configured to cause the robot cleaner to move, a memory and a processor operatively connected to the driver and the memory, the method comprising:
inputting information on locations of a plurality of objects and information on a degree of pollution for each location in a map from two or more pollution maps among a plurality of pollution maps related to a time section from a time point when a predetermined event occurred to a predetermined time point after the event was finished into a first artificial intelligence model and determining a pollution source corresponding to the event; and
moving the robot cleaner based on the location of the identified pollution source,
wherein the memory of the robot cleaner stores the first artificial intelligence model trained to determine pollution sources,
wherein the plurality of pollution maps correspond to different time points in an event timeline and include information on a degree of pollution for each location in a map corresponding to a place in which the robot cleaner is and/or was located and information on the locations of the plurality of objects includes information on the locations of the plurality of objects on the map.

12. The method of claim 11,
wherein the memory of the robot cleaner stores a second artificial intelligence model trained to identify objects, and the identifying a pollution source comprises:
determining a location in which the degree of pollution increased by greater than or equal to a threshold value after a time point when the predetermined event occurred on the map based on the pollution map;
inputting an image acquired in the determined location into the second artificial intelligence model and identifying at least one object; and
determining at least one of the identified objects as a pollution source corresponding to the event.

13. The method of claim 11, further comprising:
updating mapping information to map the identified pollution source to an event;
based on the event occurring again, identifying a pollution source mapped to the event based on the mapping information; and controlling a driver to move the robot cleaner based on the location of the identified pollution source on the map.

14. The method of claim 11, wherein the memory of the robot cleaner stores a second artificial intelligence model trained to identify objects, and further comprising:

generating the map based on sensing data acquired through a sensor;

inputting an image acquired through a camera into the second artificial intelligence model and identifying an object; and generating information on the locations of the plurality of objects based on the sensing data for the identified object acquired from the sensor.

15. The method of claim 11, wherein the moving comprises:

based on the identified pollution source being a movable object, moving based on a location to which the identified pollution source moves on the map.

16. The method of claim 11, further comprising:

identifying at least one event that increases the degree of pollution of the pollution map to greater than or equal to a threshold value among the at least one event based on information on a time when the at least one event occurred in one time section and the pollution map during the time section.

17. The method of claim 16, further comprising:

identifying a pollution source corresponding to the identified event among the plurality of objects based on information on the locations of the plurality of objects and the pollution map related to a time point when the identified event occurred.

18. A non-transitory computer-readable recording medium having stored thereon at least one instruction that when executed by a processor of a robot cleaner, causes the robot cleaner to perform at least one operation comprising:

inputting information on locations of a plurality of objects and information on a degree of pollution for each location in a map from two or more pollution maps among a plurality of pollution maps related to a time section from a time point when a predetermined event occurred to a predetermined time point after the event was finished into a first artificial intelligence model and determining a pollution source corresponding to the event; and moving the robot cleaner based on the location of the identified pollution source, wherein a memory of the robot cleaner stores the first artificial intelligence model trained to determine pollution sources, wherein the plurality of pollution maps correspond to different time points in an event timeline and include information on a degree of pollution for each location in a map corresponding to a place in which the robot cleaner is and/or was located and information on the locations of the plurality of objects includes information on the locations of the plurality of objects on the map.

* * * * *